106. COMPOSITIONS, COATING OR PLASTIC.

93

Patented July 3, 1923.

1,460,643

UNITED STATES PATENT OFFICE.

CHARLES F. CURTIS, OF LONDON, ENGLAND.

CEMENTITIOUS COMPOSITIONS SUITABLE FOR FLOORING, PAVING, AND SO FORTH.

No Drawing.    Application filed August 22, 1921.   Serial No. 494,370.

*To all whom it may concern:*

Be it known that I, CHARLES FROUDE CURTIS, a subject of the King of Great Britain, and resident of Southdown House, 43 Webbs Road, Clapham Junction, London, S. W. 11, England, have invented certain new and useful Improvements in Cementitious Compositions Suitable for Flooring, Paving, and so forth, of which the following is a specification.

This invention relates to cementitious compositions suitable for flooring, paving and so forth. The invention has for its object the provision of a composition which shall be economical in its constituents, preparation and application; which shall be of a permanent and durable nature, and which shall be free from acid. Such a composition is applicable under most conditions met with in the building industry especially, for example, where dampness exists. Further, owing to its non-acid character, it neither tends to disintegrate nor to have any deleterious effect on the object or surface over which it has to be applied.

According to the present invention such a composition is prepared by mixing together the following ingredients approximately in the following proportions, and in the manner hereinafter set forth:—

Coke breeze, 3 bushels.
Sand, 2 bushels.
Wood dust, 3 bushels.
Plaster of Paris or a similar setting composition, 1 bushel.
Portland cement, 6 bushels.
Alum, 5 ounces.
Colouring matter according to requirements.

The wood dust and plaster of Paris or a similar setting composition are thoroughly mixed together in a dry condition. The coke breeze, sand and cement are also thoroughly mixed together in a dry condition. After this these two mixtures are themselves thoroughly mixed together in a dry condition. The whole mixture is then formed into a heap, which is recessed at the middle, commonly called a "bay", and water with the colouring matter, if any, already dissolved therein is poured into the "bay" until there is nearly sufficient water for setting. Then about 5 gallons of clean water are taken and the alum dissolved therein. This alum water already is then poured into the water in the "bay" and mixed with the said water by stirring. After this the "bay" is turned in and mixed up with the water as in preparing ordinary cement.

The resulting cementitious material is then ready for laying with a trowel as is done when laying ordinary cement, or it may be placed in moulds and allowed to set so as to form tiles and so forth. I have found that the most satisfactory results can be obtained if the material is applied so as to be of a final thickness of not more than ⅜ of an inch. With such a thickness the floor can be walked upon without harm thereto after forty eight hours of the laying thereof.

Having thus described my invention what I claim as new and desire to secure by Letters Patent is:—

1. A process of making a cementitious composition consisting in mixing together 3 bushels of wood dust and 1 bushel of plaster of Paris in a dry condition, mixing together 3 bushels of coke breeze, 2 bushels of said and 6 bushels of cement in a dry condition, mixing together the two mixtures obtained, adding water in which colouring matters have been dissolved until the mixture is nearly ready for setting, then adding 5 gallons of water in which 5 ounces of alum have been dissolved, and allowing the mixture to set.

2. A process of making a cementitious composition consisting in mixing equal proportions of coke breeze and wood dust, twice the amount of Portland cement, two-thirds the amount of sand and one-third the amount of a quick setting composition, the wood dust and quick setting composition being first mixed together in a dry condition, the coke breeze, sand and cement being mixed together in a dry condition, the two mixtures obtained being then mixed together and formed into a "bay", adding water in the "bay", then adding to said water a relatively small quantity of water in which alum has been dissolved, and then turning in and mixing the "bay" with the water.

3. A process of making a cementitious composition consisting in mixing together wood dust and a small proportion of plaster of Paris in a dry condition, mixing together coke breeze, sand and a large proportion of cement in the dry condition, mixing together the two mixtures obtained, the proportion of cement in the mixture being substantially six times the amount of plaster of Paris, forming a "bay" with the mixture, pouring water into the "bay", mixing with said water in the "bay" a relatively small quantity of water in which alum has been dissolved and then turning in and mixing the "bay" with the water.

4. A cementitious composition comprising a mixture of coke breeze, sand, wood dust in substantially equal proportions, about one-third the quantity of plaster of Paris, about double the quantity of Portland cement, and water in which a small quantity of alum has been dissolved.

CHARLES F. CURTIS.